US010851689B2

(12) United States Patent
Engel

(10) Patent No.: US 10,851,689 B2
(45) Date of Patent: Dec. 1, 2020

(54) DRAINAGE PATH FOR A BEARING SUMP IN A VERTICALLY ORIENTED TURBINE ENGINE

(71) Applicant: Rolls-Royce Corporation, Indianapolis, IN (US)

(72) Inventor: Chadd D. Engel, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 373 days.

(21) Appl. No.: 16/007,679

(22) Filed: Jun. 13, 2018

(65) Prior Publication Data
US 2019/0383181 A1 Dec. 19, 2019

(51) Int. Cl.
*F01D 25/16* (2006.01)
*F01D 25/18* (2006.01)
*F01M 11/06* (2006.01)

(52) U.S. Cl.
CPC .......... *F01M 11/065* (2013.01); *F01D 25/16* (2013.01); *F01D 25/18* (2013.01); *F01M 11/064* (2013.01); *F01M 2011/068* (2013.01); *F05D 2260/602* (2013.01)

(58) Field of Classification Search
CPC . F01M 11/065; F05D 2260/602; F01D 25/18; F01D 25/16; F01D 21/00
See application file for complete search history.

(56) References Cited

U.S. PATENT DOCUMENTS

| | | | |
|---|---|---|---|
| 3,268,277 A | 8/1966 | Pratt | |
| 3,452,839 A * | 7/1969 | Swearingen | F04D 29/061 184/6 |
| 3,786,901 A * | 1/1974 | Randell | F04D 29/061 184/6.18 |
| 4,741,630 A * | 5/1988 | Oeynhausen | F01D 11/00 384/144 |
| 4,856,273 A * | 8/1989 | Murray | F01D 25/18 60/39.08 |
| 6,446,592 B1 * | 9/2002 | Wilksch | F01M 11/067 123/196 R |
| 8,210,316 B2 * | 7/2012 | DiBenedetto | F01D 9/065 184/6.11 |
| 8,893,856 B2 * | 11/2014 | Frost | F01D 25/18 184/6.11 |
| 2006/0225419 A1 * | 10/2006 | Prusinski | F02B 39/10 60/605.1 |

(Continued)

OTHER PUBLICATIONS

European Search Report, dated Nov. 14, 2019, in EP Application No. 19177579.0.

*Primary Examiner* — Michael R Mansen
*Assistant Examiner* — Mark K Buse
(74) *Attorney, Agent, or Firm* — Brinks Gilson & Lione

(57) ABSTRACT

A gas turbine engine in a shutdown mode comprises one or more rotatable shafts, a first oil sump, a second oil sump, and an oil drainage conduit fluidically connecting the first oil sump and the second oil sump. The one or more rotatable shafts are oriented with an axis of rotation less than 90 degrees from vertical. The first oil sump has a selected critical vertical level. The second oil sump is positioned at an elevation lower than the elevation of the first oil sump. The oil drainage conduit effects oil drainage by gravity from the first oil sump to the second oil sump to prevent the level of oil collected in the first oil sump from exceeding the selected critical vertical level.

20 Claims, 5 Drawing Sheets

(56) References Cited

U.S. PATENT DOCUMENTS

| | | | |
|---|---|---|---|
| 2008/0217105 A1* | 9/2008 | Streifinger | F01D 25/18 |
| | | | 184/6.23 |
| 2012/0321438 A1* | 12/2012 | Vannini | F04D 25/0686 |
| | | | 415/1 |
| 2013/0045078 A1* | 2/2013 | Boldt | F01D 25/186 |
| | | | 415/1 |
| 2014/0110945 A1* | 4/2014 | Takahashi | F01K 27/02 |
| | | | 290/54 |
| 2015/0315933 A1* | 11/2015 | Do | F01D 25/32 |
| | | | 415/112 |
| 2016/0040544 A1* | 2/2016 | Desjardins | B64D 27/10 |
| | | | 415/111 |

* cited by examiner

DRAINAGE PATH FOR A BEARING SUMP IN A VERTICALLY ORIENTED TURBINE ENGINE

BACKGROUND

Turbine engines are used in a wide variety of power and propulsion applications. Although turbine engines are typically operated with their axis of rotation oriented horizontally, in some limited applications—such as certain aircraft—the turbine engine may be operated with the axis of rotation oriented vertically. As a non-limiting example, tiltrotor aircraft may operate and shut down turbine engines with a vertically-oriented axis of rotation. The design considerations for a turbine engine with a vertically-oriented axis of rotation include modified flowpaths and collection points for engine lubricants as compared to horizontally-oriented engines.

As engine manufacturers continue to look for smaller, lighter, and more efficient engine variants, the design considerations for vertically-oriented engines may come into conflict with changes to the modern engine architecture that reduce engine size, reduce engine weight, and improve engine efficiency. It is therefore desirable to improve the flowpaths and collection points for engine lubricant in order to accommodate such changes.

SUMMARY

According to some aspects of the present disclosure, a gas turbine engine in a shutdown mode comprises one or more rotatable shafts, a first oil sump, a second oil sump, and an oil drainage conduit. The one or more rotatable shafts are oriented with an axis of rotation less than 90 degrees from vertical. The first oil sump is at a first axial position relative to said one or more rotatable shafts and has a selected critical vertical level. The second oil sump is at a second axial position relative to said one or more rotatable shafts such that said second oil sump is positioned at an elevation lower than the elevation of said first oil sump. The oil drainage conduit fluidically connects said first oil sump and said second oil sump. The oil drainage conduit has an inlet positioned in said first oil sump at a vertical level below the selected critical vertical level to thereby effect oil drainage by gravity from said first oil sump to said second oil sump to prevent the level of oil collected in said first oil sump from exceeding the selected critical vertical level.

In some embodiments the oil drainage conduit is configured to secure oil drainage when the engine leaves a shutdown mode. In some embodiments the engine further comprises a flow blocking device configured to fluidically isolate the oil drainage conduit from said first oil sump upon rotation of the rotatable shafts. In some embodiments the flow blocking device comprises one or more flaps positioned across the oil drainage conduit and wherein centrifugal forces generated by the rotation of the one or more rotatable shafts sealingly engages the flaps with the oil drainage conduit to fluidically isolate the oil drainage conduit from said first oil sump. In some embodiments the engine further comprises a flow blocking device disposed within the oil drainage conduit and configured to prevent oil flow from the second oil sump to the first oil sump.

In some embodiments each of the first oil sump and the second oil sump are disposed about a hollow shaft, and wherein the oil drainage conduit is at least partially disposed within the hollow shaft. In some embodiments the inlet comprises more than one inlet passing through the hollow shaft. In some embodiments said inlet is dimensioned to permit oil drainage at a rate sufficient to prevent the level of oil collected in said first oil sump from exceeding the selected critical vertical level. In some embodiments said more than one inlets are spaced evenly about a circumference of the shaft.

According to another aspect of the disclosure, a gas turbine engine in a shutdown mode comprises one or more rotatable shafts, a first oil sump, a second oil sump, a seal, and an oil drainage conduit. The one or more rotatable shafts are oriented with an axis of rotation less than 90 degrees from vertical. The first oil sump is at a first axial position relative to said one or more rotatable shafts. The second oil sump is at a second axial position relative to said one or more rotatable shafts such that said second oil sump is positioned at an elevation lower than the elevation of said first oil sump. The seal is positioned proximate said first oil sump such that said seal will be exposed to oil if the level of oil collected in said first oil sump exceeds a selected critical vertical level. The oil drainage conduit fluidically connects said first oil sump and said second oil sump. The oil drainage conduit has an inlet positioned in said first oil sump at a vertical level below the selected critical vertical level to thereby effect oil drainage by gravity from said first oil sump to said second oil sump to prevent the level of oil collected in said first oil sump from exceeding the selected critical vertical level.

In some embodiments the seal is disposed between a first oil sump cover and a first of the rotatable shafts, and wherein the first rotatable shaft is hollow and at least a portion of the oil drainage conduit is disposed within the first rotatable shaft.

In some embodiments the engine further comprises a flow blocking device disposed in the drainage path and configured to selectively close the drainage path during shaft rotation. In some embodiments the engine further comprises a flow blocking device disposed in the drainage path and configured to permit flow only from the first oil sump to the second oil sump. In some embodiments the engine further comprises an oil baffle disposed vertically above the seal and configured to direct oil to the oil drainage conduit.

In some embodiments the oil baffle extends between a sump cover and an inner member positioned radially inward from the seal. In some embodiments the oil baffle is annular. In some embodiments the inlet comprises more than one inlet passing through the hollow shaft, said inlets spaced evenly about a circumference of the shaft.

According to other aspects of the present disclosure, a method of preventing a level of oil collected in said first oil sump from exceeding the selected critical vertical level is presented. A gas turbine engine in a shutdown mode has one or more rotatable shafts oriented with an axis of rotation less than 90 degrees from vertical. The engine has a first oil sump with a selected critical vertical level and a second oil sump positioned at a lower elevation than the elevation of the first oil sump. The method comprises providing an oil drainage conduit between the first oil sump and the second oil sump, said oil drainage conduit having an inlet positioned in said first oil sump at a vertical level below the selected critical vertical level to thereby effect oil drainage by gravity from said first oil sump to said second oil sump.

In some embodiments the method further comprises preventing flow of oil from the second oil sump to the first oil sump. In some embodiments the method further comprises preventing oil flow through the oil drainage conduit when the one or more shafts are rotating.

BRIEF DESCRIPTION OF THE DRAWINGS

The following will be apparent from elements of the figures, which are provided for illustrative purposes.

Figure 1:
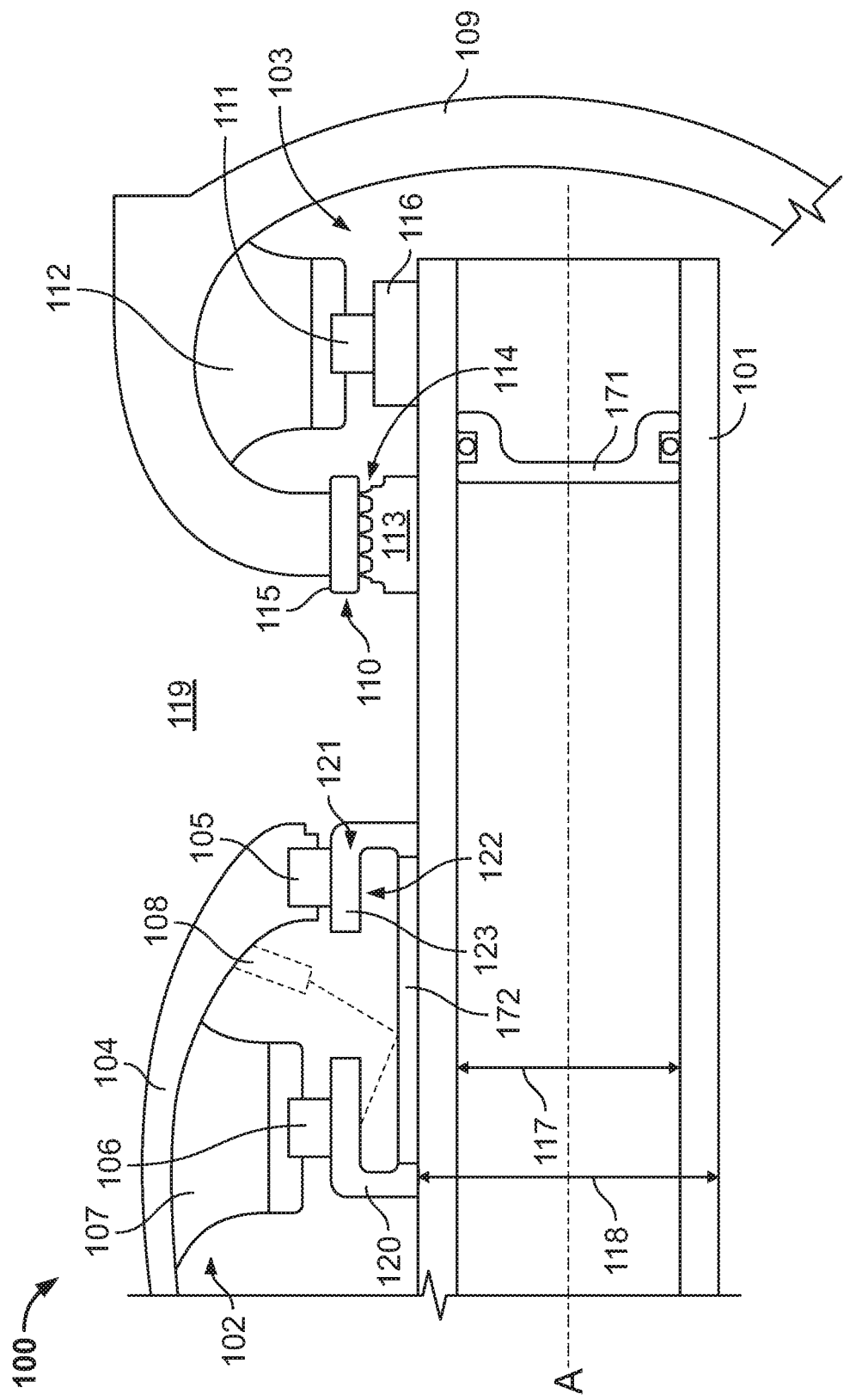
FIG. 1 is a simplified cross sectional view of a portion of a turbine engine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings and specific language will be used to describe the same.

FIG. 1 presents a simplified cross sectional view of a portion of a turbine engine 100 that may be generally used in both horizontally- and vertically-oriented applications. The turbine engine 100 may be a gas turbine engine, and may comprise one or more rotatable shafts. The portion may be an axially aft portion of the turbine engine 100.

As illustrated, the turbine engine 100 comprises a hollow rotatable shaft 101. The hollow rotatable shaft 101 may be the low speed spool of a two spool turbine engine. The hollow rotatable shaft 101 may comprise an inner diameter 117 and an outer diameter 118. The hollow rotatable shaft 101 may rotate about an axis of rotation illustrated by dashed line A. The hollow rotatable shaft 101 may be one of one or more rotatable shafts of the turbine engine 100.

The turbine engine 100 further comprises a first oil sump 102 and a second oil sump 103. The first oil sump 102 is axially offset from the second oil sump 103. When the shaft 101 is oriented vertically, the second oil sump 103 is positioned below the first oil sump 102. The first oil sump 102 may be the mid sump of the turbine engine 100 and may be referred to as the mid bearing chamber. The second oil sump 103 may be the aft sump of the turbine engine 100 and may be referred to as the aft bearing chamber. The hollow rotatable shaft 101 may include a shaft plug 171 to prevent oil from migrating from the second oil sump 103 into the hollow portion of the shaft 101.

First oil sump 102 may comprise a first sump cover 104 sealably coupled to the shaft 101 by a first oil sump seal 105. The first oil sump seal 105 may be a block- or ring-type seal, or may be a seal for sealing a static component such as a first sump cover 104 to a rotating component such as a shaft 101. The first oil sump seal 105 may seal against a first inner member 121 that is coupled to the shaft 101. The first inner member 121 may comprise an axially-extending arm 123 that is radially spaced from the shaft 101, thus defining a first volume 122.

A first bearing 106 and first bearing pedestal 107 may be disposed in the space between the first sump cover 104 and the shaft 101. The first bearing 106 may be disposed on a first bearing race 120. In some embodiments, the first bearing race 120 and first inner member 121 may be separated by a spacer 172.

An oil nozzle 108 may also be positioned to direct oil into the space between the first sump cover 104 and the shaft 101. The oil nozzle 108 may direct a flow or stream of oil toward the first bearing 106 during operation of the turbine engine 100. During operation of the turbine engine 100, oil or another suitable lubricant is contained within the first oil sump 102.

Second oil sump 103 may comprise a second sump cover 109 sealably coupled to the shaft 101 by a second oil sump seal 110. The second oil sump seal 110 may be a labyrinth seal, or may be a seal for sealing a static component such as a second sump cover 109 to a rotating component such as a shaft 101. The labyrinth seal may comprise a second inner member 113 having a plurality of knife edges 114 and an outer member 115. The knife edges 114 of the second inner member 113 form a seal against the outer member 115.

A second bearing 111 and second bearing pedestal 112 may be disposed in the space between the second sump cover 109 and the shaft 101. The second bearing 111 may be disposed on a second bearing race 116. Although not illustrated in FIG. 1, the second oil sump 103 may contain a supply of oil such as from an oil nozzle. During operation of the turbine engine 100, oil or another suitable lubricant is contained within the second oil sump 103.

Disposed between the first oil sump 102 and second oil sump 103 may be a turbine compartment 119 or other similar portion of the turbine engine 100. It is critical to prevent oil in the first oil sump 102 and second oil sump 103 from leaking from the sumps into the turbine compartment 119. During operation of the turbine engine 100, the high temperatures of the turbine compartment 119 make oil in that area susceptible to catching fire, potentially resulting in damage to the engine that may lead to a hazardous failure.

Figure 2:
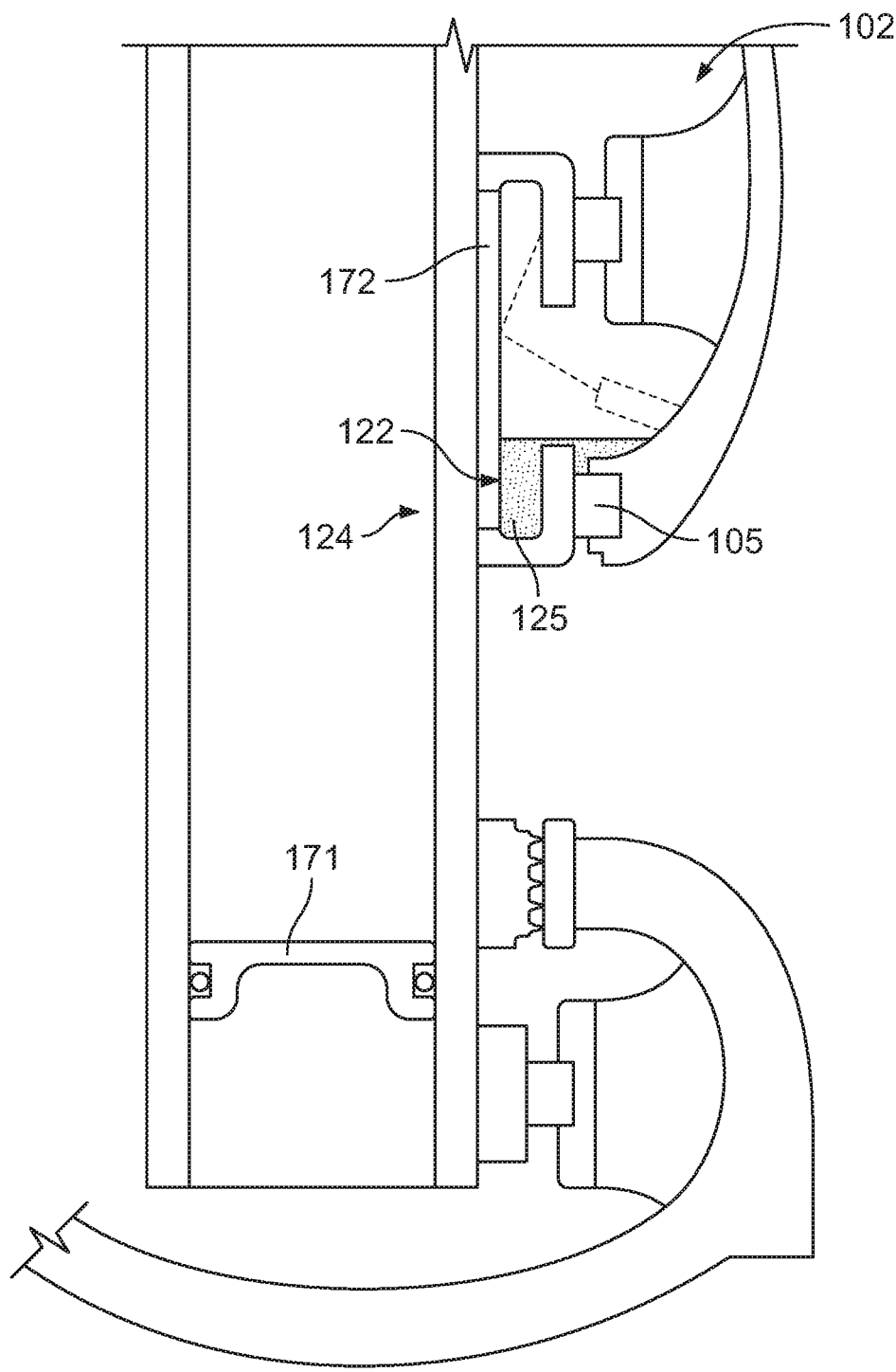
FIG. 2 is a simplified cross sectional view of a portion of a turbine engine showing the pooling of oil when the turbine engine is shut down with one or more rotatable shafts oriented vertically.

As engine manufacturers continue to design smaller, lighter, and more efficient engine variants, the various sumps of turbine engines—such as the first oil sump 102 and second oil sump 103 of turbine engine 100—may be compressed into ever-smaller design spaces. These smaller sumps, which allow for larger turbine compartments and/or smaller and potentially more efficient engines, may present unique challenges for vertically-oriented engines. FIG. 2 presents an example of one such challenge.

FIG. 2 is a simplified cross sectional view of a portion of a turbine engine 100 showing the accumulation of oil in the first oil sump 102 when the turbine engine 100 is shut down with the shaft 101 oriented vertically. Oil in the first oil sump 102 accumulates in the sump bottom 124, and more specifically may accumulate in the first volume 122 defined by the first inner member 121 and the shaft 101 or spacer 172 carried by the shaft. The accumulated oil is shown as shaded region 125.

When a sufficient volume of oil is accumulated, the vertical level of the oil 125 will exceed the vertical height of the axially-extending arm 123 and the oil 125 will flow onto and/or accumulate on the seal 105. In other words, when the volume of accumulated oil 125 exceeds the first volume 122, the seal 105 will be exposed to oil that cannot be contained in the volume 122 as is illustrated in FIG. 2.

The accumulation of oil 125 on the seal 105 is problematic. Such accumulation may lead to excessive lubrication, flooding, and/or oil coking of the seal 105. The effectiveness of the seal 105 is degraded leading to a higher likelihood of leaking oil into the turbine compartment. As discussed above, leakage of oil past the seal 105 is a potential fire hazard for the turbine engine 100.

Thus it is desirable to improve the design of the first oil sump 102 to prevent the exposure of the seal 105 to oil as it accumulates in the sump bottom 124 in a volume that exceeds the first volume 122. The present disclosure is directed to systems and methods of preventing the accumulation of oil on the seal of a sump of a turbine engine when that engine is shut down in a vertical orientation. More specifically, the present disclosure is directed to establishing flowpaths via one or more oil drainage conduits to ensure that the vertical level of oil accumulated in a sump does not exceed the height of a structure that prevents the oil from reaching the seal. The present disclosure is directed to ensuring that the vertical level of oil accumulated in a sump does not exceed a selected critical vertical level.

In some applications of the present disclosure, a turbine engine—such as the turbine engine of a tilt-rotor aircraft—may be shut down in a vertical or substantially vertical orientation. Although the present disclosure describes a turbine engine shut down in a vertical orientation, the disclosure may apply to any situation where the axis of rotation or rotatable shafts of a turbine engine are shut down at an orientation less than 90 degrees from vertical.

Figure 3:
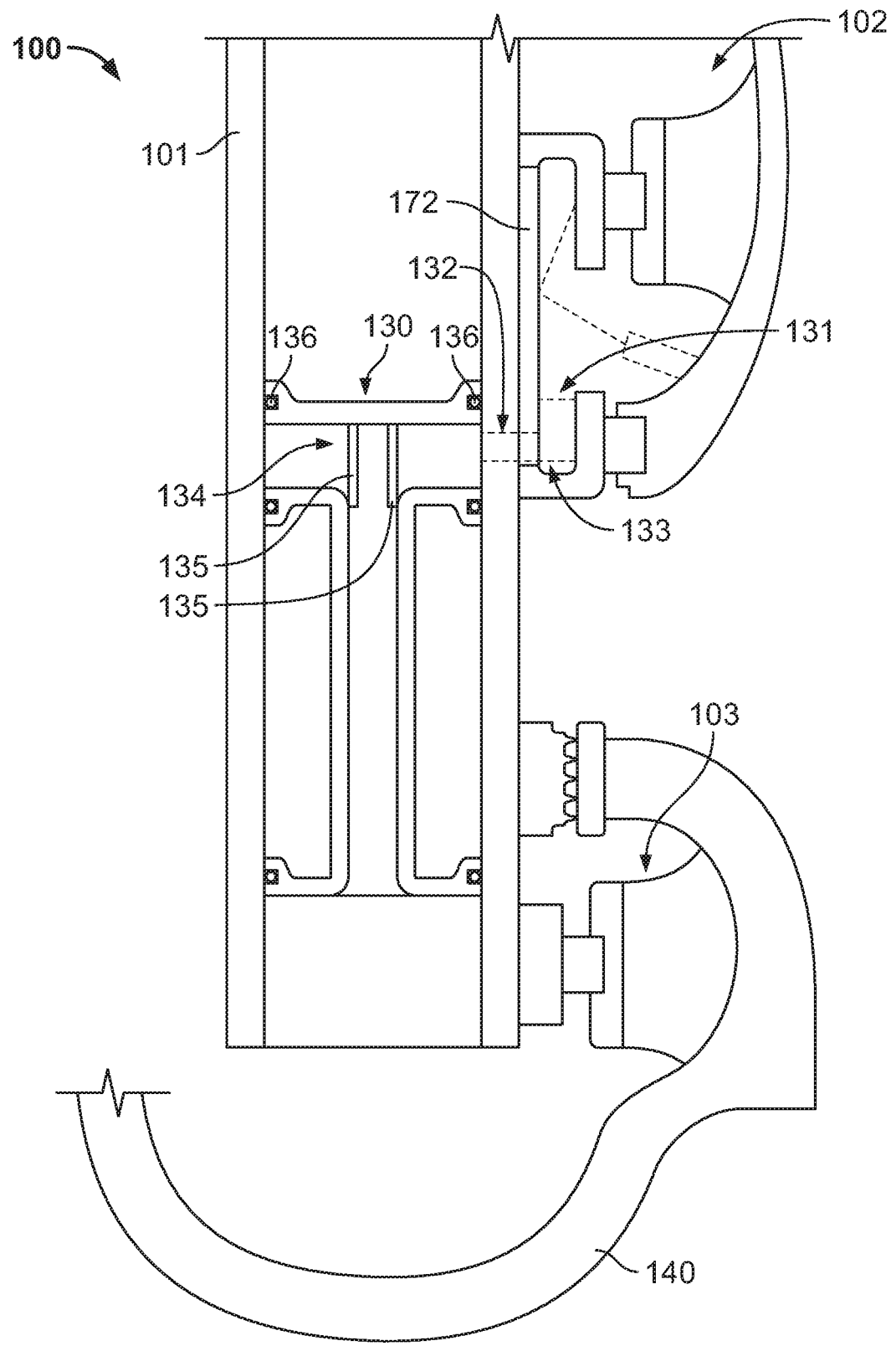
FIG. 3 is a simplified cross sectional view of a portion of a turbine engine in accordance with some embodiments of the present disclosure.

FIG. 3 is a simplified cross sectional view of a portion of a turbine engine 100 in accordance with some embodiments of the present disclosure. The turbine engine 100 comprises a first oil sump 102, second oil sump 103, and oil drainage conduit 130 fluidically connecting the first oil sump 102 and second oil sump 103. The turbine engine 100 may have a rotatable shaft 101 oriented vertically. The turbine engine 100 may have a rotatable shaft 101 oriented at less than 90 degrees from vertical. The turbine engine 100 may be in a shutdown mode.

First oil sump 102 is disposed at a first axial position relative to rotatable shaft 101. First oil sump 102 has a selected critical vertical level 131. In some embodiments the selected critical vertical level 131 may be the level at which accumulating oil will exceed a volume at which oil may be accumulated safely and without adverse consequences to the turbine engine 100. In some embodiments the selected critical vertical level 131 may be the level at which accumulating oil will exceed the vertical height of an axially-extending arm 123 of first inner member 121 and thus contact the seal 105. In other words, the seal 105 will be exposed to oil if the vertical level of the oil collected in the first oil sump 102 exceeds the selected critical vertical level 131. In some embodiments the selected critical vertical level 131 may be the vertical level of the seal 105. In other embodiments the selected critical vertical level 131 may be any vertical level at which it is undesirable to have accumulating oil rise above.

Oil drainage conduit 130 may comprise one or more conduit members that fluidically connect first oil sump 102 and second oil sump 103. The second oil sump 103 is disposed at a second axial position relative to the rotatable shaft 101. With rotatable shaft 101 positioned vertically or at less than 90 degrees from vertical, the second oil sump 103 is positioned at a lower elevation than the elevation of the first oil sump 102.

The oil drainage conduit 130 may be disposed entirely or partially within the hollow shaft 101, as shown in FIG. 3. The interface between the oil drainage conduit 130 and inner diameter 117 of shaft 101 may comprise one or more seals 136, which may take the form of elastomeric packings, sealing rings, O-rings, or other suitable static seals. In the illustrated embodiment, the turbine engine 100 includes a T-shaped oil drainage conduit 130.

The oil drainage conduit 130 has one or more inlets 132 positioned in the first oil sump 102 to effect oil drainage by gravity from the first oil sump 102 to the second oil sump 103. The one or more inlets 132 may be sized and positioned within the first oil sump 102 to prevent the vertical level of oil collected in the first oil sump 102 from exceeding the selected critical vertical level 131. The one or more inlets 132 may be positioned at a vertical level below the selected critical vertical level 131.

The one or more inlets 132 may pass through the hollow shaft 101 (i.e. passing from the outer diameter 118 to the inner diameter 117), and may be spaced evenly about the circumference of the hollow shaft 101. The one or more inlets 132 may be positioned in the first oil sump 102 such that the lower edge of the inlet 132 defines an inlet vertical level 133. The inlet vertical level 133 may be below the selected critical vertical level 131.

The oil drainage conduit 130 may be configured to selectively secure oil drainage from the first oil sump 102 to the second oil sump 103 when the turbine engine 100 leaves a shutdown mode. For example, the oil drainage conduit 130 may comprise a flow blocking device 134 configured to fluidically isolate the oil drainage conduit 130 from the first oil sump 102 upon rotation of the shaft 101. The flow blocking device 134 may be configured to prevent fluid (e.g., air and oil) flow through the oil drainage conduit 130.

In the illustrated embodiment of FIG. 3, the flow blocking device 134 comprises one or more flaps 135 positioned across the oil drainage conduit 130. When the turbine engine 100 is in a shutdown condition, oil drainage flow through the oil drainage conduit 130 is sufficient to lift one end of the flap 135 away from the oil drainage conduit 130, thus permitting flow from first oil sump 102 to second oil sump 103. However, upon rotation of the shaft 101 centrifugal forces sealingly engage the flap 135 with the oil drainage conduit 130 to prevent flow through the oil drainage conduit 130. In some embodiments, the flaps 135 under centrifugal forces sealingly engage with the oil drainage conduit 130 to fluidically isolate the oil drainage conduit 130 from the first oil sump 102.

Although the illustrated flaps 135 are disposed at a junction or bend of the oil drainage conduit 130, the flaps 135 may be positioned elsewhere in the oil drainage conduit 130 such as at the inlet 132. Flow blocking devices 134 may also be disposed external to the oil drainage conduit 130. For example, a flow blocking device 134 may be disposed within the first oil sump 102 at the inlet 132 to fluidically isolate the oil drainage conduit 130 from the first oil sump 102. Beyond flaps 135, additional flow blocking devices 134 are contemplated for use with the present disclosure, including but not limited to balls on ramped seats and/or flyweights that would seal the oil drainage conduit 130 during operation of the turbine engine 100.

In some embodiments the oil drainage conduit 130 may include a flow blocking device for preventing oil flow from the second oil sump 103 to the first oil sump 102. Such a flow blocking device may be implemented as, for example, a check valve. A flow blocking device may be disposed in the drainage path and configured to selectively close the drainage path during rotation of the shaft 101.

In some embodiments flow blocking devices may not be necessary, such that first oil sump 102 and second oil sump 103 may be in fluid communication during operation of the turbine engine 100. Oil drainage conduit 130 may therefore be used to equalize pressure between the first oil sump 102 and second oil sump 103 during operation of the turbine engine 100.

In some embodiments the second oil sump 103 may comprise an expanded second oil sump cover 140. The expanded second oil sump cover 140 may be dimensioned to accommodate the additional oil flow from the first oil sump 102 to second oil sump 103. The expanded second oil sump cover 140 may be dimensioned to contain substantially all of the oil of the first oil sump 102 and second oil sump 103 when the turbine engine 100 is shutdown in a vertical orientation.

Figure 4:
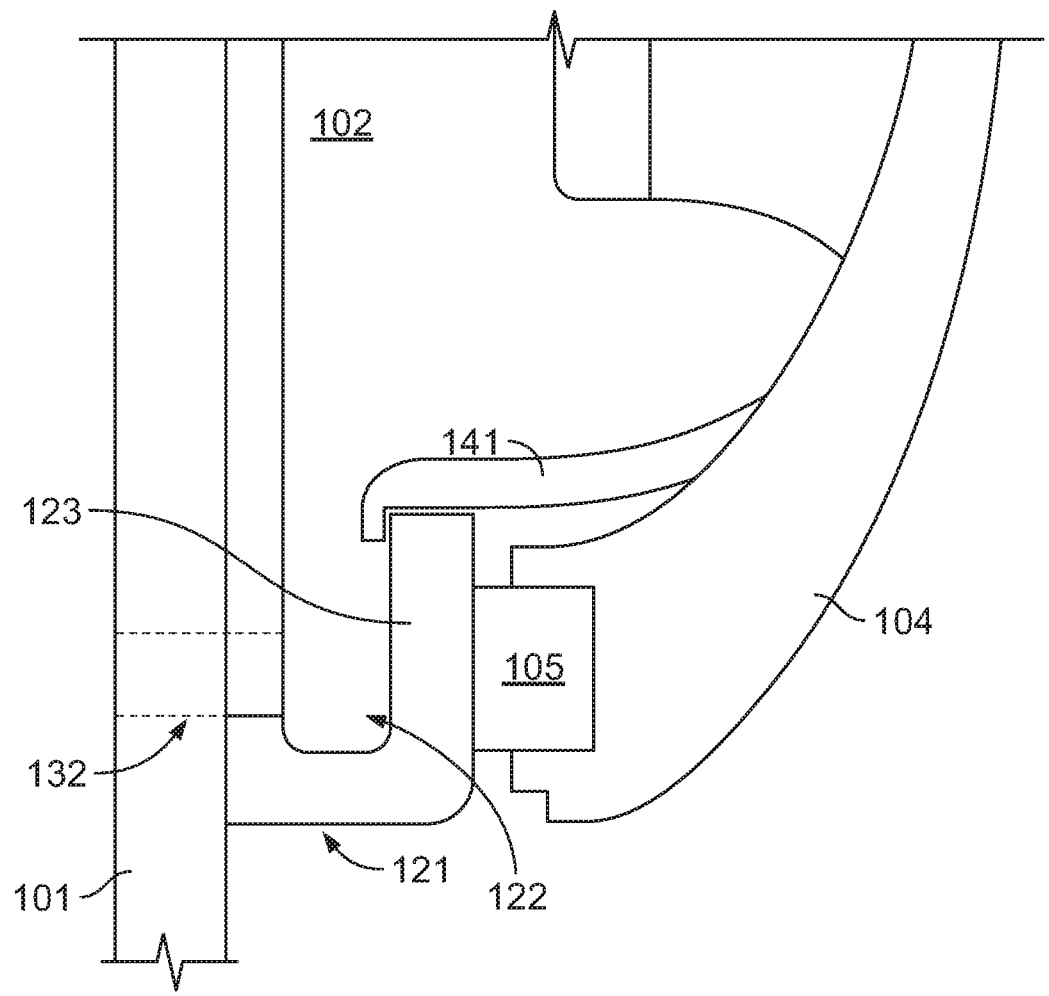
FIG. 4 is a detailed simplified cross sectional view of a portion of a turbine engine in accordance with some embodiments of the present disclosure.

In some embodiments, additional protection for the seal 105 is provided in the form of an oil baffle 141. FIG. 4 is a detailed simplified cross sectional view of a portion of a turbine engine 100 in accordance with some embodiments of the present disclosure. As shown in FIG. 4, an oil baffle 141 may be disposed above the seal 105 when the shaft 101 is in a vertical orientation. The oil baffle 141 may extend between the first sump cover 104 and first inner member 121, and may be angled or otherwise structured to direct accumulating oil toward the inlet 132 of the oil drainage conduit 130. The oil baffle 141 may comprise a continuously sloping top surface. The oil baffle 141 may extend between the first sump cover 104 and the axially-extending arm 123 of the first inner member 121. The oil baffle 141 may be annular.

As illustrated, the oil baffle 141 protects the seal 105 from excessive contact with accumulating oil in the first oil sump 102 when the turbine engine 100 is shut down with shaft 101 in a vertical orientation. Oil in the first oil sump 102 that would normally accumulate in any low-lying areas proximate or contacting the seal 105 is now directed to the first volume 122, and more generally toward the inlet 132 so that the oil can be safely drained to second oil sump 103.

When turbine engine 100 is taken out of a shutdown condition, or when the shaft 101 is rotated, the additional oil disposed in the second oil sump 103 may require scavenging via a lubrication and scavenge system in order to restore a sufficient volume of oil to the first oil sump 102.

Figure 5:
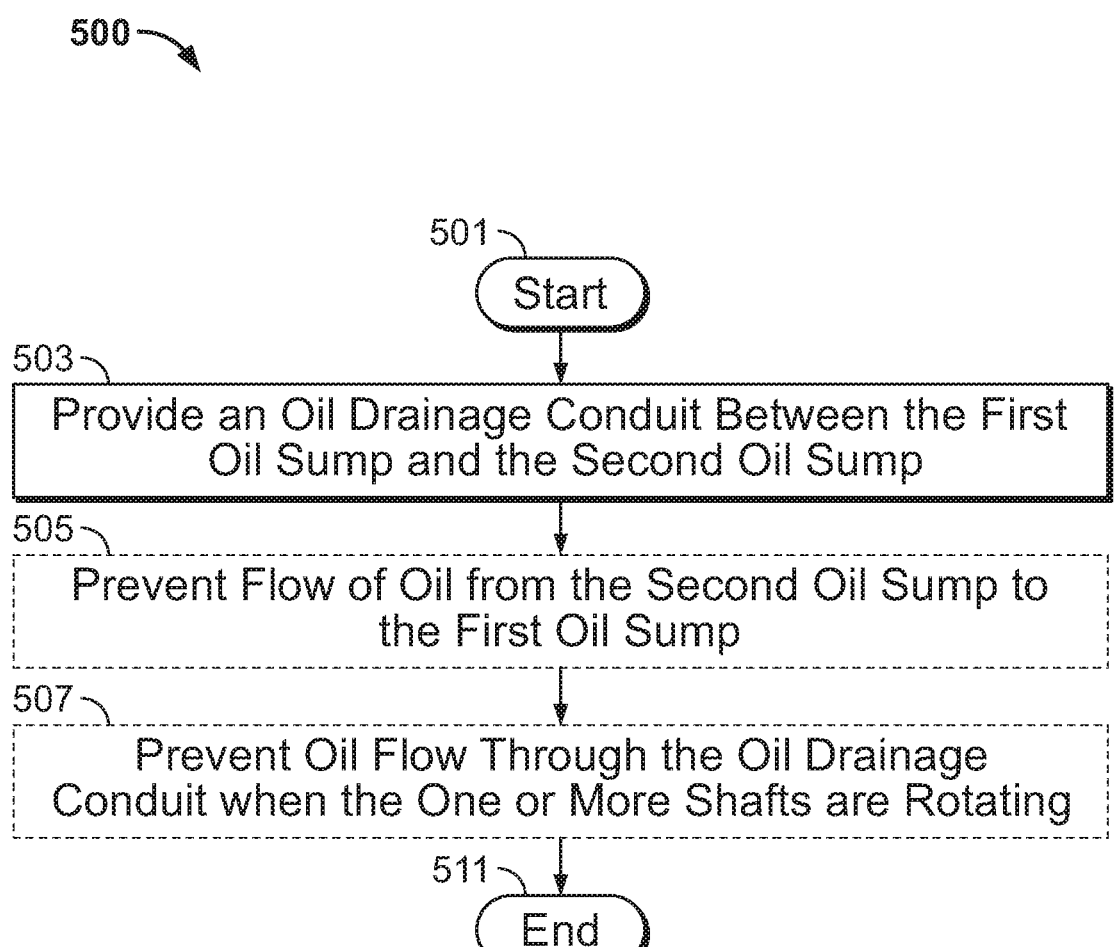
FIG. 5 is a flow diagram of a method in accordance with some embodiments of the present disclosure.

The present disclosure additionally provides methods of preventing a level of oil collected in an oil sump from exceeding a selected critical vertical level of the sump. Method 500, presented in FIG. 5, is such a method. Method 500 is intended for use in a turbine engine 100 in a shutdown mode with one or more rotatable shafts in a vertical orientation. The turbine engine 100 comprises a first oil sump 102 with a selected critical vertical level 131 and a second oil sump 103 positioned below the first oil sump 102.

Method 500 begins at Block 501. At Block 503 an oil drainage conduit 130 is provided between the first oil sump 102 and the second oil sump 103. The oil drainage conduit 130 may effect oil drainage by gravity from the first oil sump 102 to the second oil sump 103. The oil drainage conduit 130 may have an inlet 132 positioned in the first oil sump 102 at an inlet vertical level 133 below the selected critical vertical level 131. The oil drainage conduit 130 may be wholly or partly disposed within a hollow shaft 101 of the turbine engine 100. The inlet 132 may comprise one or more inlets passing from an outer diameter 118 to an inner diameter 117 of the hollow shaft 101. The inlets 132 may be sized and positioned to ensure oil accumulation does not rise above the selected critical vertical level 131.

The steps indicated at Blocks 505 and 507 are optional, as indicated by the dashed line boxes. At Block 505, flow of oil from the second oil sump 103 to the first oil sump 102 may be prevented. For example, the oil drainage conduit 130 may include a check valve disposed therein for ensuring oil flow only from the first oil sump 102 to the second oil sump 103.

Oil flow through the oil drainage conduit 130 may be prevented when one or more shafts are rotating at Block 507. For example, the oil drainage conduit 130 may comprise a flow blocking device 134 configured to fluidically isolate the oil drainage conduit 130 from the first sump 102 upon rotation of the shaft 101. The flow blocking device 134 may be configured to prevent flow through the oil drainage conduit 130. The flow blocking device 134 may comprise one or more flaps 135 positioned across the oil drainage conduit 130. When the turbine engine 100 is in a shutdown condition, oil drainage flow through the oil drainage conduit 130 is sufficient to lift one end of the flap 135 away from the oil drainage conduit 130, thus permitting flow from first oil sump 102 to second oil sump 103. However, upon rotation of the shaft 101 centrifugal forces sealingly engage the flap 135 with the oil drainage conduit 130 to prevent flow through the oil drainage conduit 130. In some embodiments, the flaps 135 under centrifugal forces sealingly engage with the oil drainage conduit 130 to fluidically isolate the oil drainage conduit 130 from the first oil sump 102.

Method 500 may further comprise providing an oil baffle 141 above the selected critical vertical level 131, the oil baffle 141 configured to direct oil toward the inlet 132 of the oil drainage conduit 130.

Method 500 ends at Block 511.

The presently disclosed systems and methods have numerous advantages over existing lubrication sump systems. The disclosed systems and methods prevent the accumulation of oil on a sump seal when a turbine engine is shut down in a vertical orientation. The prevention of oil accumulation in turn prevents flooding of the seal, coking of oil upon engine restart, and reduces the likelihood of oil leakage, fires, and other hazards to the engine. By therefore improving the longevity of the sump seal, maintenance and repair costs are greatly reduced. The present disclosure additional provides a relatively simple means for addressing the problem of oil accumulating on a sump seal, thus avoiding the complex and expensive use of piping, pumps, valves, and external tanks that could otherwise be implemented.

For ease of illustration the annular components shown above the shaft 101 in FIGS. 1-3 are not repeated below the shaft 101.

Although examples are illustrated and described herein, embodiments are nevertheless not limited to the details shown, since various modifications and structural changes may be made therein by those of ordinary skill within the scope and range of equivalents of the claims.

What is claimed is:

1. A gas turbine engine in a shutdown mode, said engine comprising:
   one or more rotatable shafts oriented with an axis of rotation less than 90 degrees from vertical;
   a first oil sump at a first axial position relative to said one or more rotatable shafts, said first oil sump having a selected critical vertical level;
   a second oil sump at a second axial position relative to said one or more rotatable shafts such that said second oil sump is positioned at an elevation lower than the elevation of said first oil sump; and an oil drainage conduit fluidically connecting said first oil sump and said second oil sump, said oil drainage conduit having an inlet positioned in said first oil sump at a vertical level below the selected critical vertical level to thereby effect oil drainage by gravity from said first oil sump to said second oil sump to prevent the level of oil collected in said first oil sump from exceeding the selected critical vertical level.

2. The engine of claim 1 wherein the oil drainage conduit is configured to secure oil drainage when the engine leaves a shutdown mode.

3. The engine of claim 2 further comprising a flow blocking device configured to fluidically isolate the oil drainage conduit from said first oil sump upon rotation of the rotatable shafts.

4. The engine of claim 3 wherein the flow blocking device comprises one or more flaps positioned across the oil drainage conduit and wherein centrifugal forces generated by the rotation of the one or more rotatable shafts sealingly engages the flaps with the oil drainage conduit to fluidically isolate the oil drainage conduit from said first oil sump.

5. The engine of claim 1 further comprising a flow blocking device disposed within the oil drainage conduit and configured to prevent oil flow from the second oil sump to the first oil sump.

6. The engine of claim 1 wherein each of the first oil sump and the second oil sump are disposed about a hollow shaft, and wherein the oil drainage conduit is at least partially disposed within the hollow shaft.

7. The engine of claim 6 wherein the inlet comprises more than one inlet passing through the hollow shaft.

8. The engine of claim 7 wherein said inlet is dimensioned to permit oil drainage at a rate sufficient to prevent the level of oil collected in said first oil sump from exceeding the selected critical vertical level.

9. The engine of claim 8 wherein said more than one inlets are spaced evenly about a circumference of the shaft.

10. A gas turbine engine in a shutdown mode, said engine comprising:
one or more rotatable shafts oriented with an axis of rotation less than 90 degrees from vertical;
a first oil sump at a first axial position relative to said one or more rotatable shafts;
a second oil sump at a second axial position relative to said one or more rotatable shafts such that said second oil sump is positioned at an elevation lower than the elevation of said first oil sump;
a seal positioned proximate said first oil sump such that said seal will be exposed to oil if the level of oil collected in said first oil sump exceeds a selected critical vertical level; and
an oil drainage conduit fluidically connecting said first oil sump and said second oil sump, said oil drainage conduit having an inlet positioned in said first oil sump at a vertical level below the selected critical vertical level to thereby effect oil drainage by gravity from said first oil sump to said second oil sump to prevent the level of oil collected in said first oil sump from exceeding the selected critical vertical level.

11. The engine of claim 10, wherein the seal is disposed between a first oil sump cover and a first of the rotatable shafts, and wherein the first rotatable shaft is hollow and at least a portion of the oil drainage conduit is disposed within the first rotatable shaft.

12. The engine of claim 10 further comprising a flow blocking device disposed in the drainage path and configured to selectively close the drainage path during shaft rotation.

13. The engine of claim 10 further comprising a flow blocking device disposed in the drainage path and configured to permit flow only from the first oil sump to the second oil sump.

14. The engine of claim 10 further comprising an oil baffle disposed vertically above the seal and configured to direct oil to the oil drainage conduit.

15. The engine of claim 14 wherein the oil baffle extends between a sump cover and an inner member positioned radially inward from the seal.

16. The engine of claim 15 wherein the oil baffle is annular.

17. The engine of claim 10 wherein the inlet comprises more than one inlet passing through the hollow shaft, said inlets spaced evenly about a circumference of the shaft.

18. In gas turbine engine in a shutdown mode having one or more rotatable shafts oriented with an axis of rotation less than 90 degrees from vertical, the engine having first oil sump with a selected critical vertical level and a second oil sump positioned at a lower elevation than the elevation of the first oil sump, a method of preventing a level of oil collected in said first oil sump from exceeding the selected critical vertical level, the method comprising:
providing an oil drainage conduit between the first oil sump and the second oil sump, said oil drainage conduit having an inlet positioned in said first oil sump at a vertical level below the selected critical vertical level to thereby effect oil drainage by gravity from said first oil sump to said second oil sump.

19. The method of claim 18 further comprising preventing flow of oil from the second oil sump to the first oil sump.

20. The method of claim 19 further comprising preventing oil flow through the oil drainage conduit when the one or more shafts are rotating.

* * * * *